United States Patent Office 3,102,137
Patented Aug. 27, 1963

3,102,137
PURIFICATION OF TEREPHTHALIC ACID
Robert H. Wise and Delbert H. Meyer, Highland, Ind., assignors to Standard Oil Company, Chicago, Ill., a corporation of Indiana
No Drawing. Filed June 1, 1959, Ser. No. 817,072
8 Claims. (Cl. 260—525)

Chemical Process

This invention relates to the purification of terephthalic acid and more specifically pertains to the purification of crude terephthalic acids to obtain highly pure terephthalic acid having little or no color-imparting impurities.

One of the principal uses for terephthalic acid is in the manufacture of polyester films and fibers such as prepared from polyethylene terephthalate. Polyethylene terephthalates to be suitable for fiber and film manufacture must be of exceptionally high purity. It follows that the terephthalic acid from which such polyesters are prepared must also be of exceptionally high purity. At present terephthalic acid which is used commercially for the preparation of polyester films and fibers is purified by converting it to its dimethyl ester, and the dimethyl ester is purified by any one of several known methods. The dimethyl terephthalate is then transesterified with ethylene glycol or other glycols to obtain a bis-glycol terephthalate. The bis-glycol terephthalate is then subjected to polycondensation forming a high molecular weight polyester by splitting out one mol of glycol for each 2 mols of bis-glycol terephthalate. As it will be appreciated, such a route to the polyethylene terephthalates and other polyesters is costly and tedious. By the purification process of the present invention there is provided a method for obtaining terephthalic acid of sufficiently high purity to prepare bis-glycol terephthalates directly from terephthalic acid without first converting a terephthalic acid to a lower dialkyl ester such as dimethyl terephthalate.

Terephthalic acids produced by the catalytic liquid phase oxidation of para dialkylbenzenes, especially para-xylene, are rather dark in color. One method for determining the color of terephthalic acid is to dissolve 5 grams of terephthalic acid in 100 milliliters of dimethyl formamide. The resulting solution is then compared with APHA standards by means of a Nesslerimeter. The color comparison so obtained is referred to herein as "DMF color."

Another method for determining the color of terephthalic acid is to combine 4 grams of terephthalic acid with about 28 milliliters of triethylene glycol in a glass tube which is heated in an aluminum block at 500° F. with nitrogen purge for about 1 hour. The tube is removed and cooled to room temperature in about 30 minutes. The solution is diluted with isopropyl alcohol 1:1, and the color of the resulting diluted solution is compared to standard APHA colors (platinic cobalt chloride solutions) by measuring absorbance with a Fisher electrophotometer using a 650 red filter and a 425 blue filter. This evaluation of the aromatic polycarboxylic acid color is reported herein as "TEG color."

To be considered sufficiently pure for direct conversion to an ester of high purity, terephthalic acid should have a DMF color of no greater than 20 and a TEG color of less than 250. For direct conversion to bis-glycol terephthalate, or a polyester thereof such as polyethylene terephthalate, terephthalic acid should have a DMF color of no greater than 5 and a TEG color of less than 150, preferably a TEG color of 100 or less.

The purification process of this invention is briefly as follows. Crude terephthalic acid is dissolved as its alkali metal salt, preferably as the water soluble sodium salt, as a near-saturated solution, 90 to 100% of saturation. The alkali metal ion should be used in at least about chemically equivalent proportions to form the water soluble alkali metal salt. The solution is then treated with a hypohalite, preferably sodium hypochlorite, either added per se or formed in situ. In the latter case the alkali metal ion should be employed in excess when forming the solution of the water soluble alkali metal terephthalate. The treatment with hypohalite is satisfactory in the range equivalent to 1 to 40 parts of active chlorine for each 100 parts of terephthalic acid in solution. The temperature of hypohalite treatment is in the range of 25° to 100° C. for a period of time of from 0.5 to 24 hours. The preferred temperature is above 60° C. and is in the range of from 60° to 100° C. Following hypohalite treatment, there is added to the aqueous solution of the alkali metal terephthalate a highly ionizable alkali metal salt preferably one having the same cation as was used in forming the solution of alkali metal terephthalate. The quantity of highly ionizable alkali metal salt should be sufficient to form an aqueous solution saturated at 20° to 30° C.

The resulting solution is cooled to 20° to 30° C. to salt out the alkali metal terephthalate as a crystalline product. This crystallization may be carried out over a period of time of 2 to 24 hours, but can be accomplished efficiently in 4 to 6 hours. The precipitated solid is recovered, washed with a saturated aqueous solution (0.5 to 5 parts of solution per part of terephthalic acid by weight) of the alkali metal salt used in the salting out step. The washed alkali metal terephthalate is redissolved in the minimum quantity of water to form a solution of the alkali metal terephthalate at 20 to 100° C., preferably 20 to 30° C. If any materials remain undissolved, these are preferably removed as for example by filtration. Purified terephthalic acid is regenerated from solution of the redissolved alkali metal terephthalate by acidifying the solution to a pH of from 1 to 2 at a temperature of from 25° to 100° C., preferably 80° to 90° C. Springing of terephthalic acid can be carried out with the concentrated aqueous solution formed on redissolving the alkali metal salt or can be carried out with a more dilute solution. Little or no advantage is gained by adding more than 50% more water to the concentrated solution. Springing of terephthalic acid from the diluted solutions may be advantageous for controlling the purity and size of the terephthalic acid crystals, for ease in pumping a more dilute slurry and for providing an aqueous recycle stream for use in dissolving the alkali metal salt of crude terephthalic acid.

The slurry formed by the springing step is cooled, preferably to 20° to 30° C., for 1 to 6 hours. The precipitated terephthalic acid is recovered by any known means for separating solids and liquids. The recovered terephthalic acid is washed, preferably first with one volume of dilute hydrochloric acid per part of terephthalic acid by weight; i.e., in the ratio of one cubic centimeter of 3 to 5% HCl per gram terephthalic acid, and then washed with water, 1 to 20 volumes of water per part of terephthalic acid by weight (in the ratio of 1 to 20 cc. per gram) being satisfactory. The washed terephthalic acid may then be dried.

As the source of alkali metal to dissolve the crude terephthalic acid, there can be employed the hydroxides, carbonates, and sulfites of sodium and potassium. While sodium and potassium hypochlorites are preferred for the treatment of the alkaline dialkali terephthalate solution, alkali metal hypobromites may also be used. Sodium chloride and potassium chlorides are the preferred highly ionizable alkali metal salts employed to salt out the dialkali terephthalate from the hypochlorite treated solution, but other highly ionizable sodium and potassium salts may be used.

To regenerate terephthalic acid from the aqueous solution of redissolved alkali metal terephthalate, such acidifying materials as the mineral acids, sulfur dioxide and carbon dioxide can be employed. Sulfuric acid and hydrochloric acid are the preferred mineral acids.

To illustrate the present invention and the necessity for each of the steps of hypohalite treatment, salting out, redissolving, and springing to regenerate terephthalic acid, the following is given. In each of the several cases hereinafter described the crude terephthalic acid had a DMF color of 300, a TEG color of 920, and an acid number of 675±1. This terephthalic acid was obtained by leaching isophthalic acid and orthophthalic acid from a mixture of these three phthalic acid isomers with water in a two-step operation. The mixture of isomeric phthalic acids was obtained from the oxidation of a mixture of isomeric xylenes in a catalytic liquid phase oxidation process using air as the oxidant and using acetic acid as the reaction medium.

*Example I*

The above-described crude terephthalic acid is dissolved as its water-soluble sodium salt by combining 100 grams of the crude terephthalic acid with 2000 grams of aqueous 2.5% sodium hydroxide solution. The resulting aqueous solution of sodium terephthalate is combined with a solution of sodium hypochlorite prepared by adding 36 grams of chlorine to 50 grams of sodium hydroxide dissolved in 348 grams of ice and water. The resulting solution is heated to its boiling point under reflux conditions for about 4 hours and thereafter is filtered through an "F" sinter-glass funnel and collected. To the filtered solution there is added 1132 grams of sodium chloride, and the resulting mixture is maintained at 90° C. and stirred. A precipitate of disodium terephthalate forms. The resulting slurry is permitted to stand overnight at room temperature. Thereafter the precipitated disodium terephthalate is recovered by filtration and is washed with a saturated aqueous solution of sodium chloride. The recovered washed disodium terephthalate is dissolved at 90–100° C. in the minimum amount of water to form a saturated solution thereof; i.e., about 13.5% disodium terephthalate by weight. This solution is filtered to remove undissolved material. The filtrate is heated to boiling and acidified to pH 1 with 20% sulfuric acid. Purified terephthalic acid precipitates. The resulting slurry is permitted to stand for 4 hours and is then filtered. The filter cake is washed with 200 milliliters of hydrochloric acid (5% HCl) and then with about 2 liters of water. The washed recovered terephthalic acid is dried. The dried product recovered represents a recovery of 97.5% of the crude terephthalic acid. The purified terephthalic acid recovered by this process has a TEG color of 30, a DMF color of 0–5 and an acid number of 674±1.

In contrast to the above, the same crude terephthalic acid is dissolved and treated with sodium hypochlorite as described in Example I. After filtering the hypochlorite treated solution, the filtered solution is acidified with concentrated hydrochloric acid (about 35% HCl) to a pH of 2. Regenerated terephthalic acid precipitates. The resulting slurry is permitted to stand for about 4 hours and is filtered to recover the terephthalic acid. The filter cake is washed 4 times by slurrying with 25 milliliters of water per part by weight of terephthalic acid. The washed terephthalic acid is dried. The washed and dried terephthalic acid has a TEG color of 130, a DMF color of 5–10 and an acid number of 675±1. Although this hypochlorite treatment provides a decrease in TEG color of about 85%, the purified terephthalic acid so obtained is still not suitable for direct reaction with glycols to produce film and fiber-forming polyesters.

*Example II*

The above-described crude terephthalic acid in an amount of 100 grams is combined with 50 grams of sodium hydroxide and 2000 grams of water. To this solution is added a solution of sodium hypochlorite prepared from 50 grams of sodium hydroxide, 32 grams of chlorine and 280 grams of ice and water. The resulting mixture is heated at its boiling point under reflux conditions for about 4 hours and filtered hot. To the filtered solution is added 980 grams of sodium chloride. Disodium terephthalate precipitates. The resulting slurry is permitted to stand for 6 hours and is then filtered. The filter cake is washed with 780 milliliters of sodium chloride saturated water. The washed disodium terephthalate is redissolved in 2170 grams of water at room temperature. The resulting solution is filtered to remove undissolved material and then acidified to pH 2 with sulfur dioxide. Terephthalic acid precipitates. The resulting slurry is filtered. The filtrate is collected and processed as hereinafter described. The filter cake is washed 4 times with about 2 liters of water. The washed terephthalic acid is then dried. By this process a purified terephthalic acid having a DMF color of about 5, a TEG color of less than 100 and an acid number of 675±1 can be obtained.

To the above collected filtrate from the step of springing terephthalic acid, there is added 80 grams of the crude terephthalic acid hereinabove described. The resulting slurry is heated at its boiling point under reflux conditions until complete solution of terephthalic acid is obtained. To the resulting solution is added sodium hypochlorite obtained by reacting about 26 grams of chlorine with 40 grams of sodium hydroxide and 280 grams of ice and water. The combined solutions are heated to boiling under reflux conditions for about 5 hours and thereafter filtered. To the filtered solution is added 1080 grams of sodium chloride. Disodium terephthalate precipitates. The resulting slurry is permitted to stand overnight at room temperature. Thereafter the slurry is filtered and the filter cake is washed with about 200 milliliters of sodium chloride saturated water. The filter cake is dissolved in 2480 milliliters of water, filtered to remove undissolved material and the filtrate is acidified to pH 2 with sulfur dioxide. Terephthalic acid precipitates. The precipitate is recovered by filtration and washed 4 times by slurrying with 1 liter of water for about 30 minutes. The washed terephthalic acid is recovered and dried. The purified terephthalic acid obtained by the reuse of the sodium ions by recycling the solution of sodium sulfites to the dissolving step may be recovered as a highly purified product having a DMF color of about 5 and a TEG color of 100 or less.

*Example III*

A crude terephthalic acid obtained by filtering the reaction mixture resulting from the catalytic oxidation of para-xylenes with air in a liquid phase oxidation system where acetic acid was employed as the reaction medium has an acid number of 664±1, a TEG color of 1150 and a DMF color of 100. This crude terephthalic acid can be purified by the process of this invention following the process as exemplified in Example I or Example II. By either of these processes a highly pure terephthalic acid having a DMF color of about 5, a TEG color of 100 or less and an acid number of 674±1 can be obtained.

In contrast to the results obtainable by the purification of the crude terephthalic acid as described in Example III, merely treating the aqueous solution of disodium terephthalate with sodium hypochlorite results in a recovered dried terephthalic acid having a DMF color of about 20, a TEG color of about 260 and an acid number of about 675±1. Because the recovered terephthalic acid still contains a substantial amount of color bodies, as is indicated by the TEG color of 260, this terephthalic acid is not suitable for direct esterification to esters of high purity. Also, the crude terephthalic acid, as described in Example III, is dissolved in water as its water-soluble sodium salt. The resulting solution is saturated with sodium chloride and is permitted to stand until disodium terephthalate is precipitated from solution. The slurry is filtered. The precipitated disodium terephthalate is redissolved in water and acidified to spring terephthalic acid. The washed and dried terephthalic acid obtainable by this method has a DMF color of about 100, a TEG color of about 820 and an acid number of about 665±1. It can be readily seen that such a purification by salting out, although reducing the TEG color, has little or no effect in increasing the acid number. Although the TEG color is somewhat reduced, still the recovery of terephthalic acid is far from being acceptable for direct esterification to produce high purity esters.

In either of the processes of Examples I, II or III exemplifying this invention the crude terephthalic acid solution can be treated with chlorine in place of adding sodium hypochlorite. More specifically, the process of Example II would be carried out by dissolving 100 grams of crude terephthalic acid in 2380 grams of aqueous solution containing 100 grams of sodium hydroxide. Then 32 grams of chlorine would be added. Thereafter the resulting solution would be boiled under reflux conditions and otherwise processed as described in Example II.

What is claimed is:

1. The process for the purification of crude terephthalic acid obtained from the oxidation of xylene containing p-xylene by catalytic liquid phase oxidation employing air as the oxidant and acetic acid as the reaction medium which comprises dissolving said crude acid in an aqueous solution containing alkali metal ions selected from the class consisting of sodium and potassium ions to form an aqueous solution of alkali metal terephthalate containing from 90 to 100% of its saturation at a temperature of from 25 to 100° C., treating said solution of crude terephthalic acid with an alkali metal hypohalite selected from the class consisting of sodium and potassium hypohalites at a temperature above 60° C. in an amount corresponding to 1 to 40 parts of active halogen per 100 parts of terephthalic acid equivalent by weight in solution, adding to the resulting solution a highly ionizable water-soluble alkali metal salt selected from the class consisting of sodium and potassium chlorides wherein the alkali metal thereof corresponds to the alkali metal of the alkali metal terephthalate in an amount to saturate said solution at a temperature in the range of from 20 to 30° C., thereafter cooling this solution to 20 to 30° C. to crystallize the alkali terephthalate, separating said alkali terephthalate from the mother liquor, washing the recovered solids with a saturated aqueous solution of said highly ionizable salt, redissolving the washed alkali terephthalate in water in an amount to obtain a solution containing 90 to 100% of its saturation at 20 to 80° C., thereafter acidifying the solution to a pH of from about 1.0 to 2.0 at 25 to 100° C., cooling the acidified solution to 20 to 30° C., and recovering the regenerated purified and decolorized terephthalic acid.

2. The process of claim 1 wherein the aqueous solution of redissolved alkali metal terephthalate is filtered before acidifying.

3. The process of claim 2 wherein the filtered solution is diluted before acidifying.

4. The process of claim 1 wherein crude terephthalic acid is dissolved as its water-soluble sodium salt, the hypohalite is sodium hypochlorite and the highly ionizable alkali metal salt is a sodium salt.

5. The process of claim 1 wherein crude terephthalic acid is dissolved as its water-soluble potassium salt, the hypohalite is potassium hypochlorite and the highly ionizable alkali metal salt is a potassium salt.

6. The process of claim 1 wherein the hypohalite is formed in situ.

7. The process for the purification of crude terephthalic acid obtained by the oxidation of p-xylene by catalytic liquid phase oxidation employing air as the oxidant and acetic acid as the reaction medium which comprises dissolving crude terephthalic acid as its water-soluble sodium salt in water at 90 to 100% of its saturation in water at 60 to 100° C., adding sodium hypochlorite to said solution in an amount to provide 1 to 40 parts of active chlorine per 100 parts of terephthalic acid equivalent by weight in solution and heating the solution to 60 to 100° C., adding sodium chloride to said solution in an amount to saturate said solution at 25° C., cooling the sodium chloride-disodium terephthalate solution to 25° C., to crystallize the sodium terephthalate, separating the crystallized sodium terephthalate from the mother liquor, washing the recovered sodium terephthalate with a saturated aqueous solution of sodium chloride, dissolving the washed sodium terephthalate in water to form an aqueous solution saturated at 20 to 30° C., filtering said solution, diluting said filtered solution to one half of the saturation at 20 to 30° C., heating the dilute solution to 80 to 90° C., acidifying this hot solution to a pH of 2 to regenerate terephthalic acid, cooling said acidified solution to 25° C., and recovering the regenerated purified and decolorized terephthalic acid.

8. The process for the purification of crude terephthalic acid obtained by the oxidation of p-xylene by catalytic liquid phase oxidation employing air as the oxidant and acetic acid as the reaction medium which comprises dissolving crude terephthalic acid as its water-soluble sodium salt in water at 90 to 100% of its saturation in water at 60 to 100° C., forming sodium hypochlorite in situ in said solution in an amount to provide 1 to 40 parts of active chlorine per 100 parts of terephthalic acid equivalent by weight in solution and heating the solution to 60 to 100° C., adding sodium chloride to said solution in an amount to saturate said solution at 25° C., cooling the sodium chloride-disodium terephthalate solution to 25° C. to crystallize the sodium terephthalate, separating the crystallized sodium terephthalate from the mother liquor, washing the recovered sodium terephthalate with a saturated aqueous solution of sodium chloride, dissolving the washed sodium terephthalate in water to form an aqueous solution saturated at 20 to 30° C., filtering said solution, diluting said filtered solution to one half of the saturation at 20 to 30° C., heating the dilute solution to 80 to 90° C., acidifying this hot solution to a pH of 2 to regenerate terephthalic acid, cooling said acidified solution to 25° C., and recovering the regenerated purified and decolorized terephthalic acid.

References Cited in the file of this patent

UNITED STATES PATENTS 2,936,267     Fernholz et al. _____ May 10, 1960

OTHER REFERENCES

Weissberger: Separation and Purification, vol. III, 473–5 (2nd ed., 1956).

German application, Serial No. C 9764, printed Apr. 5, 1956.